US005892885A

United States Patent [19]

Smith et al.

[11] Patent Number: 5,892,885

[45] Date of Patent: Apr. 6, 1999

[54] VARIABLE SPEED CONTROL SWITCH FOR DIRECT CURRENT ELECTRIC POWER TOOLS

[75] Inventors: Jackson Henry Smith, Union Grove, Ala.; Michael Thomas Little, Milwaukee, Wis.

[73] Assignee: Eaton Corporation, Cleveland, Ohio

[21] Appl. No.: 76,559

[22] Filed: May 12, 1998

[51] Int. Cl.[6] .......... H02P 5/165

[52] U.S. Cl. .......... 388/809; 388/838; 388/937; 318/139

[58] Field of Search .......... 318/139; 388/809, 388/838, 937

[56] References Cited

U.S. PATENT DOCUMENTS

| | | | |
|---|---|---|---|
| Re. 22,267 | 9/1943 | Matthews | 200/166 |
| 3,329,842 | 7/1967 | Brown | 310/68 |
| 3,389,365 | 6/1968 | Matthews et al. | 338/200 |
| 3,536,973 | 10/1970 | Matthews et al. | 318/345 |
| 3,575,648 | 4/1971 | Ridding | 318/59 |
| 3,739,126 | 6/1973 | Sahrbacker et al. | 200/157 |
| 4,508,999 | 4/1985 | Melocik et al. | 318/139 |
| 4,555,651 | 11/1985 | Melocik et al. | 318/139 |
| 4,665,290 | 5/1987 | Piber | 200/303 |
| 4,737,661 | 4/1988 | Lessig, III et al. | 307/140 |
| 5,003,628 | 3/1991 | Houser et al. | 388/815 |
| 5,198,793 | 3/1993 | Leveque | 338/172 |
| 5,200,657 | 4/1993 | Prestel | 310/50 |
| 5,289,047 | 2/1994 | Broghammer | 307/125 |
| 5,380,971 | 1/1995 | Bittel et al. | 200/536 |

*Primary Examiner*—Karen Masih
*Attorney, Agent, or Firm*—Quarles & Brady

[57] ABSTRACT

A motor control circuit for a power tool includes a function switch which has a first battery contact, a speed control contact, a bypass contact and, a second battery contact connected in that order in a line. The function switch also has a movable contact which sequentially connects the first battery contact to the bypass contact, the speed control contact to the second battery contact, and the bypass contact to the second battery contact. A solid state switch has conduction path connecting the speed control contact to the second motor terminal wherein the conduction path is controlled in response to an oscillator signal.

17 Claims, 5 Drawing Sheets

VARIABLE SPEED CONTROL SWITCH FOR DIRECT CURRENT ELECTRIC POWER TOOLS

BACKGROUND OF THE INVENTION

The present invention relates to variable speed controls for direct current electric motors; and more particularly to such controls for operating hand-held, battery powered tools which are driven by an electric motor.

Hand-held power tools, such as electric drills and dry-wall screwdrivers, utilize a DC electric motor to rotate a bit which either drills a hole or turns a screw. These power tools often have a pistol-like grip with a trigger which is manually operated by the user of the tool with the speed of the motor being controlled by the degree to which the user presses the trigger. This allows the speed of the drill or screwdriver bit to be varied depending upon the particular application for the tool. For example, the speed of a drill bit can be controlled to correspond to the hardness of the material being drilled; e.g. the harder the material, the slower the drill bit should rotate.

The trigger, which is spring biased into an off position, is mechanically connected to a switch which closes upon the user depressing the trigger from that off position. The trigger also is mechanically connected to a wiper of a potentiometer in the speed control circuit and the resistance of the potentiometer changes with trigger movement. One type of control circuit responds to changes in the potentiometer resistance by pulse width modulating the electric current applied to the motor. That is, the electric current is applied in the form of pulses having duty cycles that vary to control the motor speed. The greater the duty cycle, the longer the current pulse, and the faster the motor operates.

The trigger operates several contacts of the speed control switch and it is desirable to have the switch be compact and cost effective while providing smooth control of the tool's speed.

SUMMARY OF THE INVENTION

A general object of the present invention is to provide a variable speed control circuit for a hand-held power tool driven by a direct current motor.

Another object is to provide a compact multiple function switch for the variable speed control circuit.

A further object of the present invention is to provide a switch having a single moveable contact which sequentially engages a plurality of stationary contacts for different modes of motor operation.

These and other objectives are satisfied by a control circuit includes a function switch having a series of stationary contacts. A first battery contact is provided to connect to a first terminal of a battery. A speed control contact is adjacent to the first battery contact and is intended to be connected to a first terminal of the motor by a solid state switching device. A bypass contact is adjacent to the speed control contact and is intended to be connected to the first terminal of the motor to bypass the solid state switching device. The function switch also includes a second battery contact adjacent to the bypass contact for connection to a second terminal of the battery. A movable contact, upon movement in one direction, sequentially connects the first battery contact to the bypass contact, then connects the speed control contact to the second battery contact, and then connects the bypass contact to the second battery contact.

In the preferred embodiment of the present invention, the first battery contact, the speed control contact, the bypass contact and the second battery contact are located along a line. That embodiment also has ribs of electrically insulating material located between the first battery contact and the speed control contact, and between the bypass contact and the second battery contact. The ribs separate the respective contacts thereby preventing the movable contact from touching the separated contacts at the same time which would produce a short circuit.

DETAILED DESCRIPTION OF THE INVENTION

Figure 1:
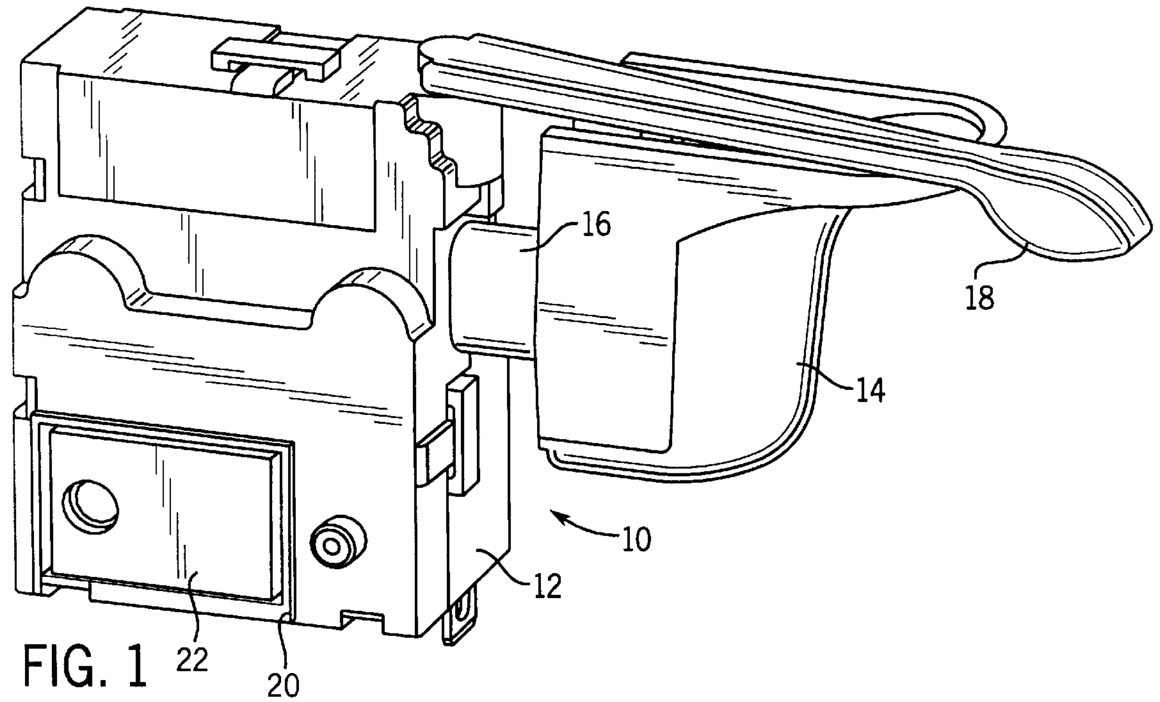
FIG. 1 is an isometric view of a variable speed control for an battery powered tool according to the present invention.

With initial reference to FIG. 1, a speed control 10 for a DC motor driven power tool has an enclosure 12 of an electrical insulating material, such as plastic. A trigger 14 projects from the enclosure on a shaft 16 which is movable into and out of the enclosure through an aperture. Above the trigger 14 is a direction control lever 18 which pivotally extends through another aperture of the enclosure 12. By pivoting the direction control lever 18 a user of the power tool is able to determine whether the motor of the tool is driven in a forward or a reverse direction. The degree to which the trigger 14 is pushed toward the enclosure 12 determines the rate at which the motor turns in the selected direction. The enclosure has an opening 20 through which a portion of the case of a metal oxide field effect transistor (MOSFET) 22 extends so that the case may be attached to an external heat sink within the power tool.

Figure 2:
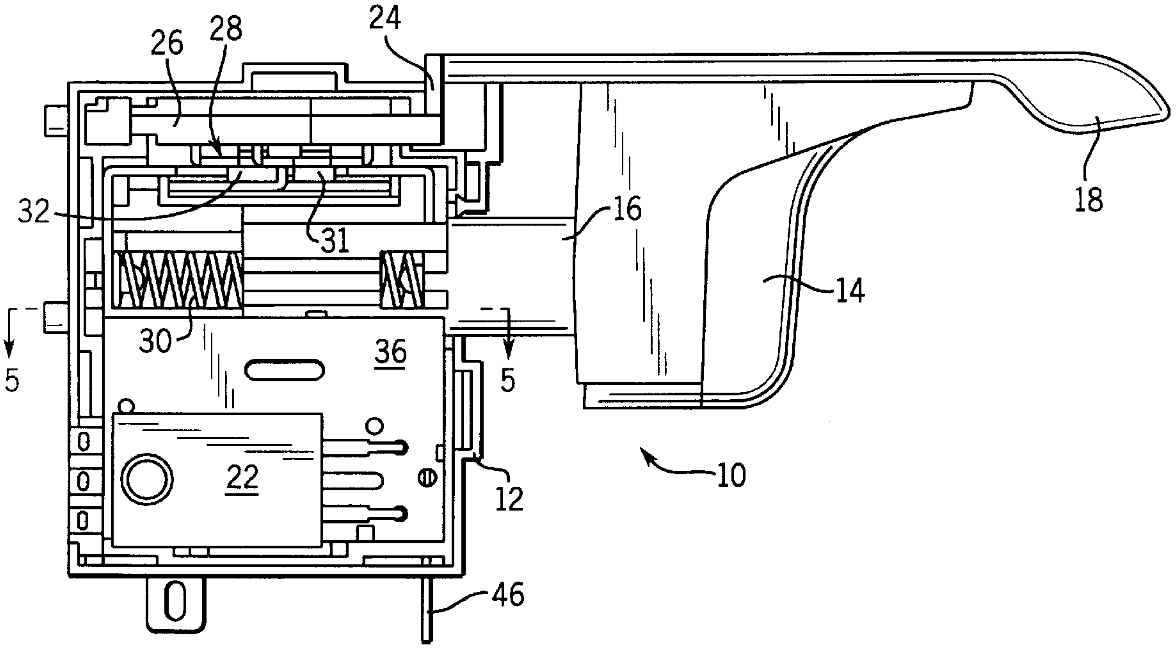
FIG. 2 is a view of one side of the variable speed control with part of the enclosure removed.

FIG. 2 illustrates the variable speed control 10 with the facing portion of the enclosure 12 removed in order to observe the internal assembly. The speed control lever 18 has an intermediate pin 24 which couples the external portion of the lever 18 to an internal lever portion 26. The internal lever portion 26 operates movable contacts of a double-pole double-throw (DPDT) direction control switch 28, which controls the direction that direct current from a battery flows through the motor of the power tool, and thus the direction that the motor rotates. The direction control switch 28 is shown in greater detail in FIGS. 3 and 4 and is connected to a pair of motor terminals 31 and 32, visible in FIG. 4.

Figure 3:
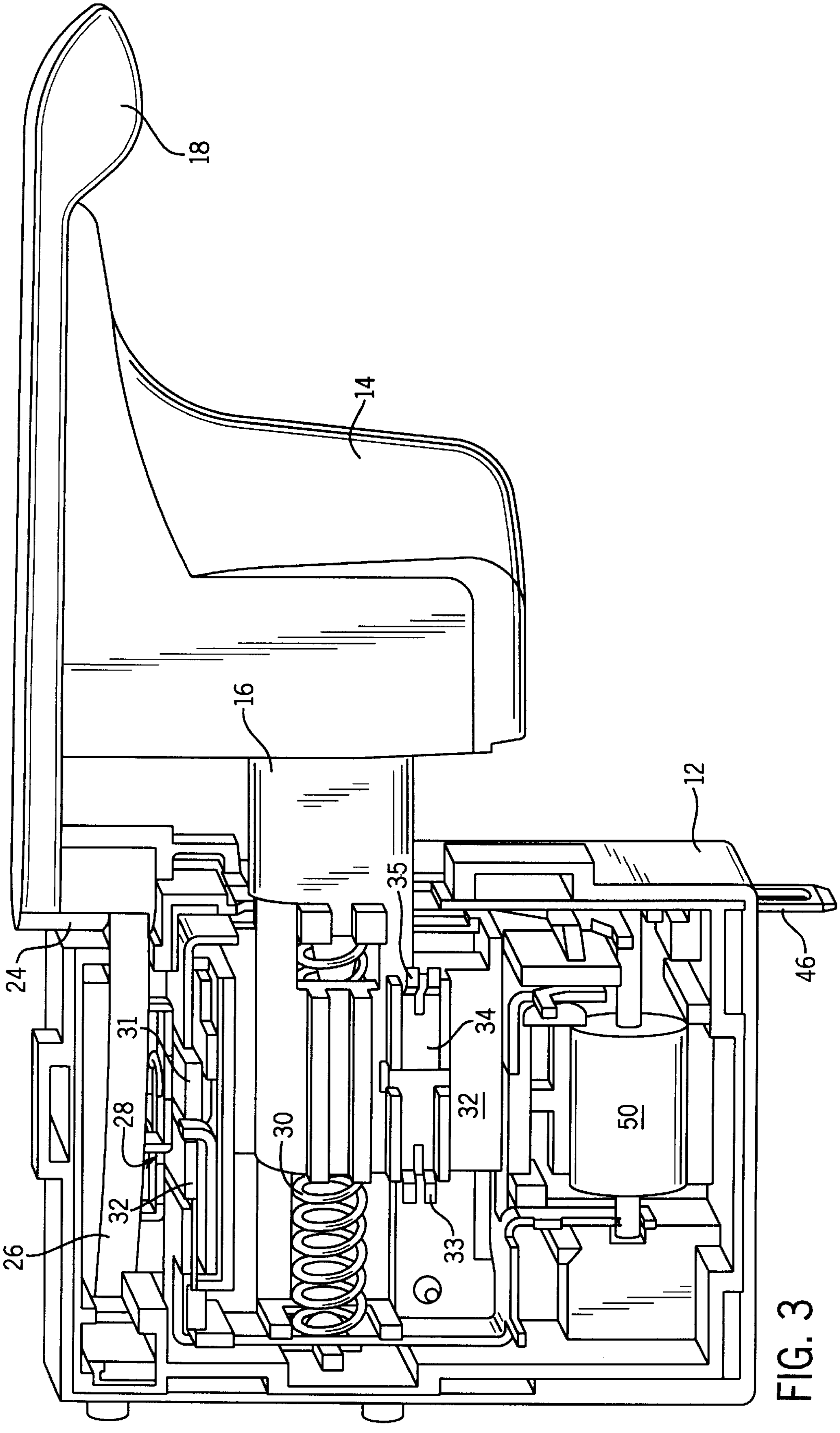
FIG. 3 is a view of the one side of the variable speed control with a printed circuit board removed.
Figure 4:
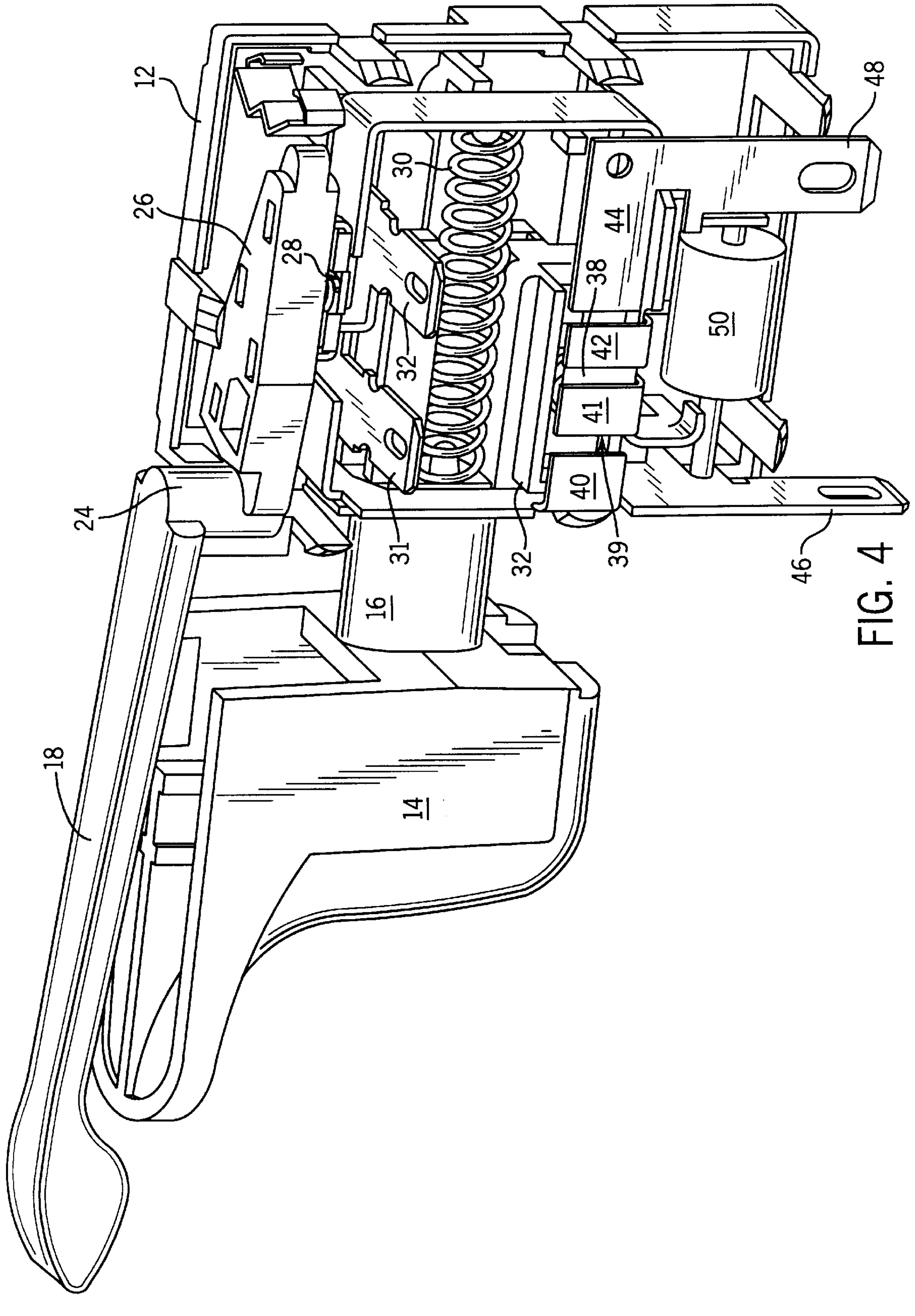
FIG. 4 is a view of an opposite side of the variable speed control with another part of the enclosure removed.

With continuing reference to FIGS. 2–4, a compression spring 30 biases the trigger shaft 16 outward from the enclosure 12 into a normal position at which the power tool is in the off state. The internal end of the trigger shaft 16 has a contact carrier 32. A wiper 34 for a potentiometer 64 of the variable speed control circuit 10 is mounted on one side of the contact carrier 32 (see FIG. 3), so that the wiper 34 moves laterally within the enclosure 12 as the trigger is depressed and released. A contact 33 at one end of the wiper 34 rubs against a metal conductor on the surface of a printed circuit board 36 shown mounted in the enclosure in FIG. 5 and a contact 35 at the other end moves across a resistive coating applied to the printed circuit board.

Figure 5:
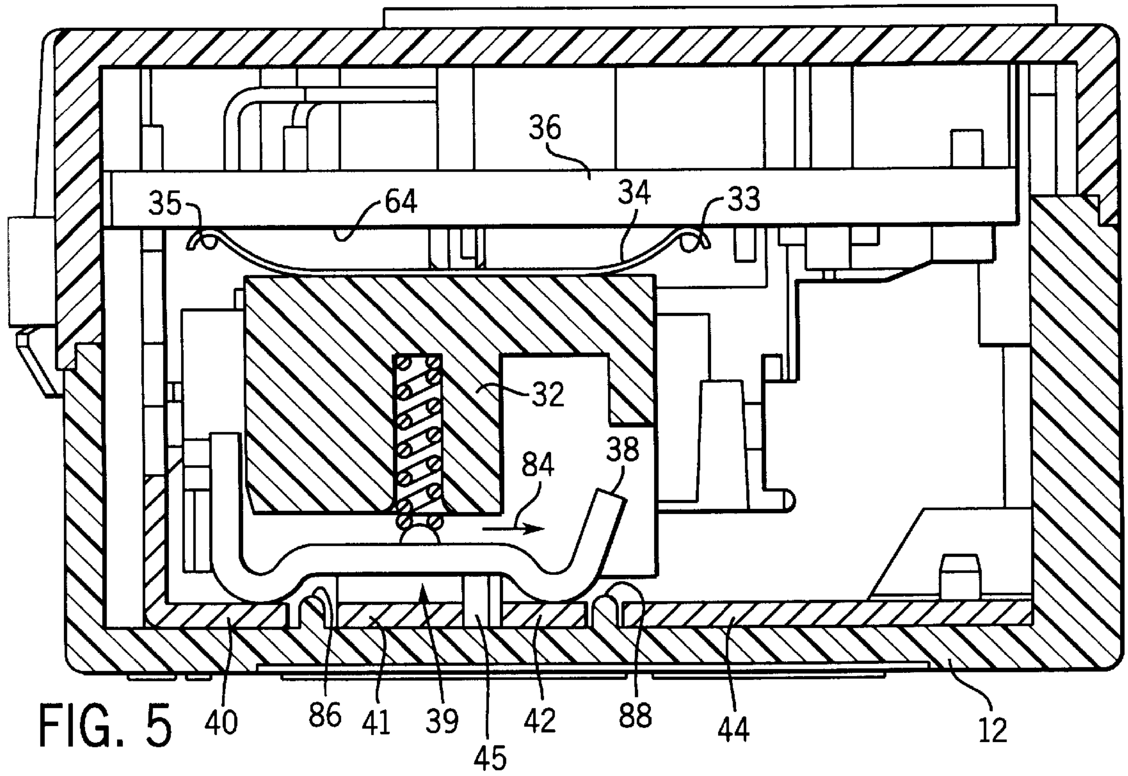
FIG. 5 is a cross sectional view taken along line 5—5 in FIG. 2.

With reference to FIGS. 4 and 5, a movable, or bridge, contact 38 of a function switch 39 is held on the opposite side of the trigger contact carrier 32. The movable contact 38 bridges different ones of a set of four stationary contacts 40, 41, 42, and 44 depending on the position of the trigger 14 and its contact carrier 32, as seen in FIG. 5. A positive stationary contact 40 is connected to the positive battery terminal 46 of the variable speed control circuit and a negative stationary contact 44 is connected to the negative battery terminal 48. As the trigger 14 moves toward the enclosure 12, the contact carrier 32 pushes the movable contact 38 across the stationary switch contacts 40–44, as will be described.

Figure 6:
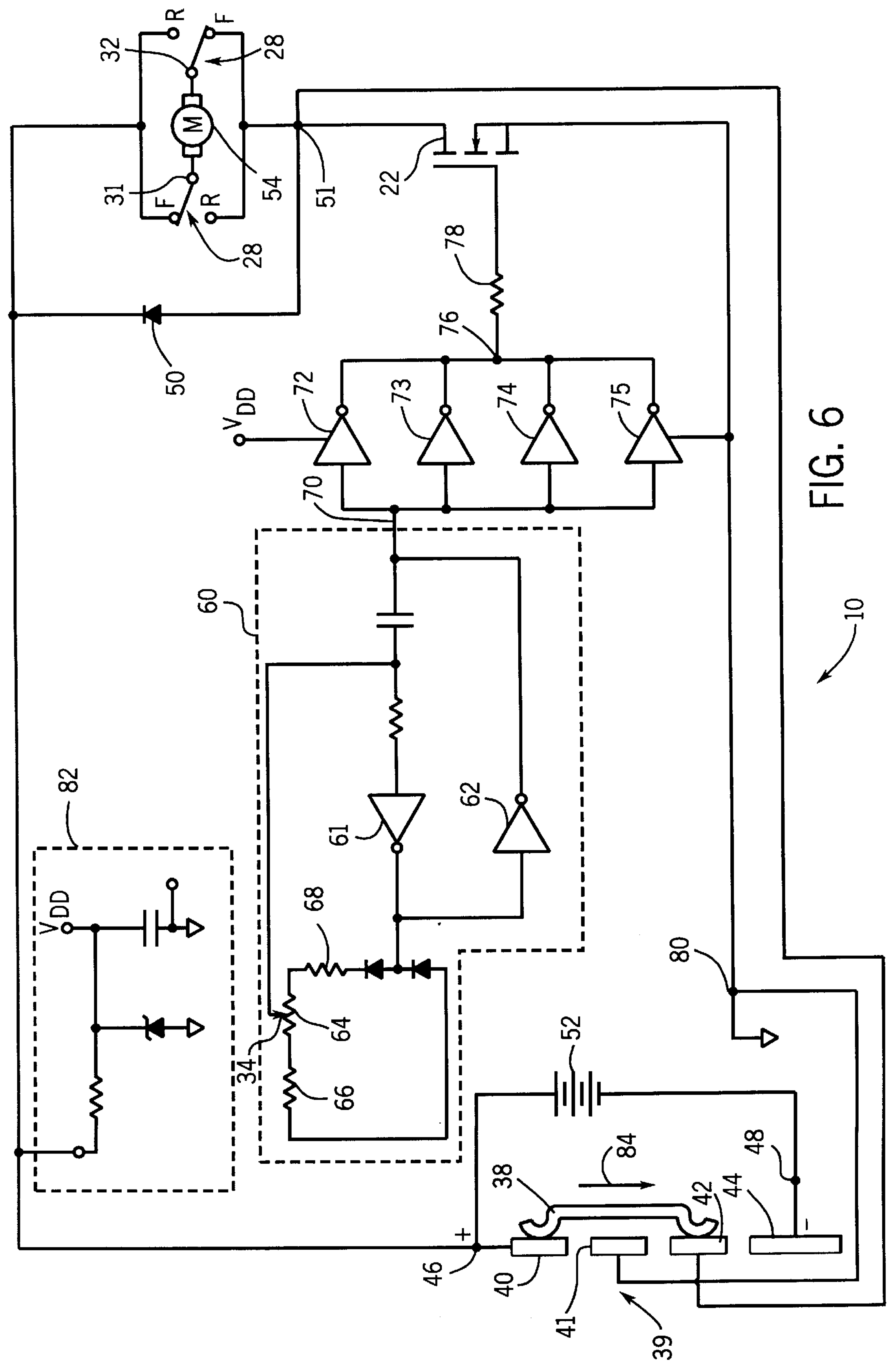
FIG. 6 is a schematic diagram of the electrical circuitry for the battery operated power tool.

The variable speed control circuit 10 is electrically connected to the other components of the hand-held power tool as shown in FIG. 6. Specifically, a battery 52 is connected across the battery terminals 46 and 48, and a DC motor 54 is connected to the motor terminals 31 and 32. The two motor terminals 31 and 32 are connected by separate switch sections of the DPDT motor direction control switch 28. One stationary contact of each switch pole is connected to the positive battery terminal 46 with the other stationary contact being connected to an intermediate node 51. A free wheeling diode 50 is connected between the positive battery terminal 46 and the intermediate node 51 in reverse biased direction.

The source drain conduction path of the MOSFET 22 is connected between the intermediate node 51 and a circuit ground node 80. The circuit ground node 80 is connected to stationary contact 41 of the motor function switch 39, which is designated as the speed control (SC) contact. The remaining stationary contact 42 of the motor function switch 39 is designated as a bypass (BP) contact and is connected directly to the intermediate node 51. As used herein, the phrases "connected directly" and "for connection directly to" refer to an electrical connection which has negligible impedance.

The remainder of the components of the variable speed control circuit 10 are mounted on the printed circuit board 36. Specifically, an oscillator 60, built around a pair of inverters 61 and 62, includes the potentiometer 64 having wiper 34 mounted on the contact carrier 32 of the trigger 14. Movement of the wiper 34 with the trigger changes the voltage divider formed by the potentiometer 64 and fixed resistors 66 and 68 of the oscillator. This action changes the duty cycle of the oscillator, i.e. the width of the pulses produced on output line 70 varies.

The oscillator output signal is applied to the inputs of four inverters 72, 73, 74 and 75 connected in parallel with a common output coupled by resistor 78 to the gate electrode of the MOSFET 22. The parallel connected inverters 72–75 act as a current amplifier with the multiple devices serving to reduce the source impedance to drive the MOSFET 22. Although in this particular implementation of the circuit to drive the MOSFET, inverters are used, other types of buffers or amplifiers may be employed.

The different inverters 61, 62 and 72–75 of the variable speed control circuit 10 are connected to a power supply 82 which derives the supply voltage VDD from the positive battery voltage at terminal 46.

Prior to the user operating the variable speed control circuit 10, the spring 30 pushes the trigger assembly 14 to its full outward position transporting the movable bridge contact 38 to the off position illustrated is FIGS. 5 and 6. When the user first depresses the trigger, the contact carrier 32 of the trigger 14 transports the movable contact 38 in a direction shown by arrow 84 in these figures. As the movable contact 38 travels to the edges of the positive and bypass stationary contacts 40 and 42, the movable contact rides onto a pair of insulating ridges 86 and 88 which protrude from the enclosure 12. This travel disengages the movable contact 38 from the stationary contacts 40–44 so that the gaps between adjacent stationary contacts will not be bridged by the movable contact. As a consequence, the movable contact will not short all four of the stationary contacts 40–44 together in an intermediate position of its travel. Further depression of the trigger 14 moves the movable contact 38 onto the speed control contact 41 and the negative battery contact 44. At this time, the negative terminal 48 is connected to the ground node 80 of the variable speed control circuit 10 and power is applied to the circuit components.

At this point in the movement of the trigger 14, the wiper 34 of potentiometer 64 assumes an initial position which causes the oscillator 60 to produce an output signal having a relatively long positive pulse during each oscillator cycle. When the oscillator output signal is inverted by the parallel connected inverters 72–75, a signal is produced at node 76 which has a relatively short positive pulse during each signal cycle. When this resultant signal is applied to the gate of the MOSFET 22, the transistor will be conductive for brief periods separated by relatively long non-conductive periods. As a result, the motor 54 receives short pulses of electric current and turns at a relatively slow speed. The direction of movement is set by the position of the direction control switch 28, with the forward position being illustrated.

As the user depresses the trigger 14 farther into the enclosure 12, movement of the potentiometer wiper 34 changes the duty cycle of the oscillator 60 to produce shorter duration positive pulses at node 70. The inversion of these pulses by inverters 72–75 produce increasingly longer positive pulses at node 76 which turn on the MOSFET 22 for longer periods. Thus the speed of the motor increases as the user presses the trigger farther inward. During this mode of operation, the movable contact 38 continues to move across the surfaces of the speed control stationary contact 41 and the negative stationary contact 44 in a direction indicated by arrow 84.

Eventually the speed of the motor 58 increases to almost its maximum speed, at which point one end of the movable contact 38 bridges the gap 45 between the speed control contact 41 and the bypass contact 42, see FIG. 5. Note that the gap 45 between these contacts does not have a ridge similar to ridges 86 and 88 between other pairs of the contacts 40–44. This is because one wishes a smooth transition from variable speed control to bypass mode of operation in which the battery terminals are connected directly across the motor 54.

When the trigger 14 is fully depressed, the movable contact 38 couples the bypass stationary contact 42 to the negative stationary contact 44. This connects the negative terminal 48 of the battery 52 directly to intermediate node 51 on one side of the motor 54. The other side of the motor always is connected directly to the positive battery terminal 46. In this bypass mode, the speed control stationary contact 41 is disconnected from the other contacts 40, 42, and 44 and power is removed from the oscillator 60 and the parallel connected inverters 72–75. Thus the MOSFET 22 is turned off in the bypass mode as it is bypassed by the connection of contacts 42 and 44.

The process of speed control is reversed as the user releases the trigger allowing it to move away from the enclosure 12. In this situation, the movable contact 38 is traveling in the reverse direction to that indicated by arrow 84 and travels from a position where it is bridging stationary contacts 42 and 44 to where it again connects the speed control stationary contact 41 with the negative stationary contact 44. In this state, power is once again applied to the oscillator and to the parallel connected inverters 72–75. Further releasing of the trigger causes the motor speed to decrease in the reverse operation from that previously described to increase the speed.

Eventually the trigger reaches the end of outward travel where the movable contact 38 bridges the positive and bypass stationary contacts 40 and 42, as illustrated in FIG. 6. In this position of motor function switch 39, the negative battery terminal 48 is disconnected from the variable speed control circuit 10 and the motor is de-energized. In addition, the bridging of stationary contacts 40 and 42 by movable contact 38 creates a low resistance path between the motor terminals 31 and 32, thereby utilizing the back EMF produced in the motor 54 to brake the motor. Thus the present circuit provides dynamic braking of the motor 54 when it enters the off state.

The foregoing description was primarily directed to preferred embodiment of the invention while some attention was given to various alternatives within the scope of the invention. It is anticipated that one skilled in the art will likely realize additional alternatives that are now apparent from the disclosure of embodiments of the invention. Accordingly, the scope of the invention should be determined from the following claims and not limited by the above disclosure.

We claim:

1. A variable speed control for a DC electric motor connected to a solid state switching device for powering by a battery, said variable speed control having a motor function switch which comprises:

a first battery contact for connection to a first terminal of the battery;

a speed control contact adjacent to the first battery contact and for applying electric current to the solid state switching device;

a bypass contact adjacent to the speed control contact and for connection directly to the DC electric motor;

a second battery contact adjacent to the bypass contact and for connection to a second terminal of the battery; and a movable contact which moves in one direction from a first position at which the moveable contact connects the first battery contact to the bypass contact to a second position at which the moveable contact connects the speed control contact to the second battery contact, and then to a third position at which the moveable contact connects the bypass contact to the second battery contact.

2. The variable speed control as recited in claim 1 wherein the first battery contact is connected to a positive terminal of the battery, and the second battery contact is connected to a negative terminal of the battery.

3. The variable speed control as recited in claim 1 further comprising: a first rib of electrically insulating material located between the first battery contact and the speed control contact, wherein the first rib prevents the movable contact from simultaneously touching the first battery contact and the speed control contact; and a second rib of electrically insulating material located between the bypass contact and the second battery contact, wherein the second rib prevents the movable contact from simultaneously touching the bypass contact and the second battery contact.

4. The variable speed control as recited in claim 1 wherein the first battery contact, the speed control contact, the bypass contact and the second battery contact are located along a line.

5. The variable speed control as recited in claim 1 wherein the first battery contact, the speed control contact, the bypass contact and the second battery contact are aligned side by side.

6. The variable speed control as recited in claim 1 further comprising a mechanism for biasing the movable contact into a position in which the movable contact connects the first battery contact to the bypass contact when the variable speed control is in an off state.

7. A variable speed control for a DC electric motor connected to a solid state switching device for powering by a battery, said variable speed control comprises:

a user operable member having a contact carrier;

a first battery contact for connection to a first terminal of the battery;

a speed control contact adjacent to the first battery contact and for applying electric current to the solid state switching device;

a bypass contact adjacent to the speed control contact and for connection directly to the DC electric motor;

a second battery contact adjacent to the bypass contact and for connection to a second terminal of the battery; and a movable contact attached to the contact carrier for movement in one direction from a first position at which the moveable contact connects the first battery contact to the bypass contact to a second position at which the moveable contact connects the speed control contact to the second battery contact, and then to a third position at which the moveable contact connects the bypass contact to the second battery contact.

8. The variable speed control as recited in claim 7 wherein the user operable member comprises a trigger with a shaft connecting the trigger to the contact carrier.

9. The variable speed control as recited in claim 7 further comprising a potentiometer at least partially formed on a printed circuit board having a wiper attached to the contact carrier and rubbing against the printed circuit board.

10. The variable speed control as recited in claim 9 wherein the movable contact is mounted on one side of the contact carrier, and the wiper is mounted on an opposite side of the contact carrier.

11. The variable speed control as recited in claim 7 wherein the first battery contact, the speed control contact, the bypass contact and the second battery contact are aligned side by side.

12. The variable speed control as recited in claim 7 further comprising a first rib of electrically insulating material located between the first battery contact and the speed control contact, wherein the first rib prevents the movable contact from simultaneously touching the first battery contact and the speed control contact; and a second rib of electrically insulating material located between the bypass contact and the second battery contact, wherein the second rib prevents the movable contact from simultaneously touching the bypass contact and the second battery contact.

13. A variable speed control for a DC electric motor powered by a battery, the variable speed control comprising:

first and second battery terminals for connecting the battery to the variable speed control;

first and second motor terminals for connecting the motor to the variable speed control;

a motor function switch having a first battery contact connected to the first battery terminal and to the first motor terminal, a speed control contact adjacent to the first battery contact, a bypass contact adjacent to the speed control contact and connected to the second motor terminal, a second battery contact adjacent to the bypass contact and connected to the second battery terminal, and a bridge contact moveable from a first position at which the bridge contact connects the first battery contact to the bypass contact to a second position at which the bridge contact connects the speed control contact to the second battery contact, and then to a third position at which the bridge contact connects the bypass contact to the second battery contact;

an oscillator that produces a signal; and a solid state switching device coupled to the oscillator and having a conduction path connecting the speed control contact to the second motor terminal wherein the conduction path is rendered conductive and non-conductive in response to the signal.

14. The variable speed control as recited in claim 13 wherein the first battery contact, the speed control contact, the bypass contact and the second battery contact are aligned side by side.

15. The variable speed control as recited in claim 13 further comprising a first rib of electrically insulating material located between the first battery contact and the speed control contact, wherein the first rib prevents the bridge contact from simultaneously touching the first battery contact and the speed control contact; and a second rib of electrically insulating material located between the bypass contact and the second battery contact, wherein the second rib prevents the bridge contact from simultaneously touching the bypass contact and the second battery contact.

16. The variable speed control as recited in claim 13 wherein the bridge contact is in the first position in an off state thereby providing a short circuit across the DC electric motor which causes a braking action.

17. A variable speed control for a DC electric motor powered by a battery, the variable speed control comprising:

first and second battery terminals for connecting the battery to the variable speed control;

first and second motor terminals for connecting the motor to the variable speed control; and a motor function switch including:

(a) a first battery contact for connection to a first terminal of the battery, (b) a second battery contact for connection to a second terminal of the battery, (c) a speed control contact, located between the first battery contact and the second battery contact, for applying electric current to the solid state switching device, (d) a bypass contact, located between the speed control contact and the second battery contact, for connection directly to the DC electric motor, and (e) a bridge contact movable from a first position at which the moveable contact connects the first battery contact to the bypass contact to a second position at which the bridge contact connects the speed control contact to the second battery contact, and then to a third position at which the bridge contact connects the bypass contact to the second battery contact, wherein the first position is an off position which provides a dynamic brake connection for the DC electric motor.

* * * * *